Aug. 21, 1923.

J. JUNG 1,465,849

DRAFT COUPLING

Filed May 4, 1922

Inventor

John Jung.

By

Lacey & Lacey. Attorneys

Patented Aug. 21, 1923.

1,465,849

UNITED STATES PATENT OFFICE.

JOHN JUNG, OF CAMPBELLSPORT, WISCONSIN.

DRAFT COUPLING.

Application filed May 4, 1922. Serial No. 558,381.

*To all whom it may concern:*

Be it known that I, JOHN JUNG, a citizen of the United States, residing at Campbellsport, in the county of Fond du Lac and State of Wisconsin, have invented certain new and useful Improvements in Draft Couplings, of which the following is a specification.

This invention relates to means for connecting a plow or other implement to a tractor and has for its object the provision of a simple and efficient device which may be easily attached to the drawbar of a tractor and adjusted so as to apply the proper draft to the plow or other implement. In plowing a field by the use of tractor-drawn plows, it is frequently necessary to shift the plow laterally with respect to the tractor in order to hold the plow to the desired path, this necessity for shifting the plow being especially marked when working upon the side of a hill or upon steep grades. My invention seeks to provide a draft coupling which may be easily adjusted from the seat of the tractor without stopping the travel of the same and without disconnecting the plow from the tractor. The invention also seeks to provide means whereby the coupling will be held in a set position after having been adjusted. Other incidental objects of the invention will appear in the course of the following description.

In the accompanying drawings, which illustrate one embodiment of my invention,—

Figure 1:
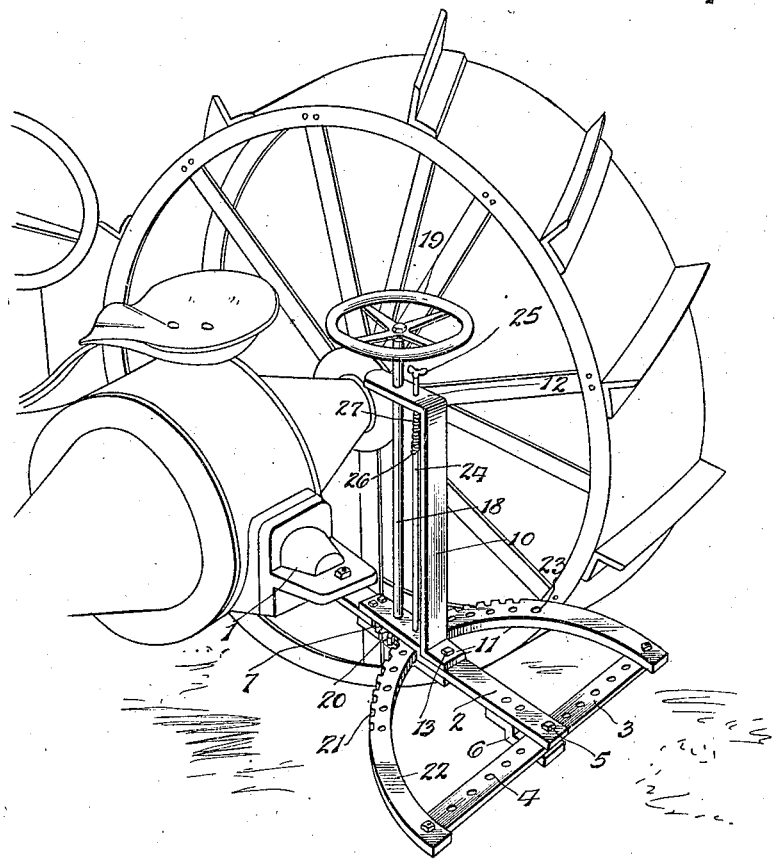
Figure 1 is a perspective view of a portion of a tractor showing my improved draft coupling attached thereto.
Figure 2:
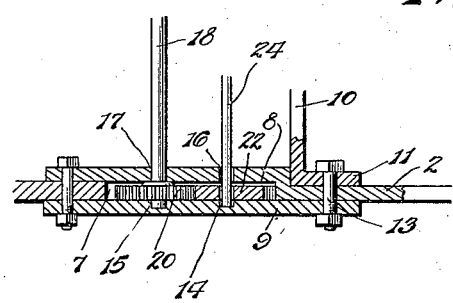
Fig. 2 is a detail longitudinal section through the lower portion of the adjusting mechanism.

The tractor may be of any well-known type and is equipped with the usual drawbar 1 at its rear end. In carrying out my invention, I employ a draft bar 2 which is secured at its front end to the said drawbar 1 and has a drawhead 3 pivotally attached to its rear end. This drawhead 3 is illustrated as consisting of a flat bar having openings 4 therethrough, in any one of which a clevis may be engaged so as to connect a plow or other implement to the drawhead. It will also be readily noted that the drawhead extends in both directions from the draft bar 2 so that a plurality of plows may be connected thereto and so arranged that the draft will be balanced at the two sides of the draft bar. To aid in supporting the drawhead and prevent bending of the pivot bolt 5, I provide a keeper 6 which is secured to the draft bar 2 in advance of its rear extremity and projects under the drawhead, as clearly shown. The draft bar is constructed to provide a recess or chamber 7 at an intermediate point of its length and, in the present instance, this chamber is produced by offsetting the draft bar vertically, as shown at 8, and bridging the under side of the offset portion by a base plate 9 rigidly secured at its ends to the under side of the draft bar. The forward portion of the draft bar may be formed integral with the offset portion 8 or may be a separate plate or bar having its rear ends secured between the front extremities of the base plate 9 and the offset portion 8 of the draft bar. Abutting the shoulder presented by the rear end of the offset 8 is a standard 10 provided with a foot 11 at its lower end which rests upon the upper side of the draft bar 2, a securing bolt 13 being inserted through the said foot and through the rear end of the base plate 9 so as to secure the parts rigidly together. At its upper end, the standard 10 is provided with a forwardly projecting arm 12 having openings therethrough alining respectively with sockets 14 and 15 in the upper side of the base plate 9 and with openings 16 and 17 formed through the offset portion of the draft bar. A steering shaft 18 is rotatably fitted in the openings 17 and the socket 15, as clearly shown in Fig. 2, and passes through the forward opening in the arm 12, as shown in Fig. 1, a steering wheel 19 being secured upon the upper end of said steering shaft as shown. Within the chamber 7, a pinion 20 is secured upon the lower end of the steering shaft 18 and said pinion meshes with a rack 21 provided upon the forward edge of an arcute bar 22 which is secured rigidly at its ends to the ends of the drawhead 3 and has its intermediate portion passing through the chamber 7 so as to mesh with the pinion 20, as shown and as will be readily understood. Through the forward portion of the arcuate bar 22 a plurality of openings 23 is formed, and a locking pin 24 is slidably fitted through the openings 16 and the opening in the bar 12 alined therewith, the lower end of said locking pin being adapted to pass through one of the openings 23 and seat in the socket 14, as will be readily understood. A handle 25 is provided upon the upper end of the locking pin 24 and around the said locking pin below the arm 12, and bearing against the said arm and against an abutment 26 on the locking pin, is a coiled spring 27 which yieldably holds the locking pin in its lowest position.

The draft coupling having been attached to the tractor, as shown in Fig. 1, a clevis which may be of any well-known form attached to the front end of the plow or other implement is engaged in the proper opening 4 and the machine may then be driven over the field. If it should develop that the plow is not running in true alinement with the tractor, the locking pin 24 is raised so as to release the arcuate bar 22, after which the steering wheel 19 is rotated so that the pinion 20 will be actuated and by its engagement with the rack 21 will shift the same and the draw-head 3 pivotally about the bolt 5 thereby quickly bringing the plow into the proper position to follow the desired path. When the desired position of the plow has been attained, the locking pin 24 is released and the spring 27 will instantly cause it to engage the alined opening 23 and again seat in the socket 14 so that the coupling device will be held in the adjusted position.

It will be readily noted that I have provided an exceedingly simple device by the use of which agricultural implements may be drawn over a field by a tractor and maintained in proper alinement with the tractor. The coupling can be easily adjusted without stopping the tractor and without requiring the operator to leave his seat. In turning a corner at the end of a furrow, the plow may be shifted relative to the tractor by proper manipulation of the steering wheel so that a short turn may be made without causing the tractor to run upon the plowed land or requiring a wide sweep to be described. The plow or other implement may be adjusted laterally with respect to the tractor as frequently as may be necessary without causing any interruption to the work of plowing.

Having thus described the invention, what is claimed as new is:

1. In a draft coupling, the combination of a draft bar having a chambered portion between its ends, a drawhead pivotally secured between its ends to the rear end of the draft bar, an arcuate rack secured to the ends of the drawhead and projecting forwardly therefrom and passing through and guided and supported by the chambered portion of the draft bar, a locking pin supported upon the draft bar and arranged to engage the draft bar and the rack and hold the rack in a set position, a pinion housed within the chambered portion of the draft bar and meshing with the rack, and means carried by the draft bar for actuating said pinion.

2. In a draft coupling, the combination of a draft bar having a chambered portion intermediate its ends, a drawhead pivoted between its ends to the rear end of the draft bar, a rack secured to and projecting forwardly from the drawhead and passing through the chambered portion of the draft bar, a standard rising from the draft bar, a locking pin fitted in said standard and in the draft bar to engage the rack and hold the same in a set position, a pinion disposed within the chambered portion of the draft bar and meshing with the rack, and a steering shaft rotatably supported by the standard and the draft bar and fitted in said pinion.

In testimony whereof I affix my signature.

JOHN JUNG. [L. S.]